US008658850B2

(12) United States Patent
Nakamura

(10) Patent No.: US 8,658,850 B2
(45) Date of Patent: Feb. 25, 2014

(54) METHOD OF DETOXIFYING A HARMFUL COMPOUND

(75) Inventor: Koichiro Nakamura, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 185 days.

(21) Appl. No.: 12/740,480

(22) PCT Filed: Oct. 29, 2008

(86) PCT No.: PCT/JP2008/003091
§ 371 (c)(1),
(2), (4) Date: Apr. 29, 2010

(87) PCT Pub. No.: WO2009/057300
PCT Pub. Date: May 7, 2009

(65) Prior Publication Data
US 2010/0305386 A1    Dec. 2, 2010

(30) Foreign Application Priority Data

Nov. 2, 2007  (JP) ................................. 2007-286374

(51) Int. Cl.
*C01B 19/00* (2006.01)
*C01G 28/02* (2006.01)
*C01G 28/00* (2006.01)
*G21F 9/00* (2006.01)
*A62D 3/33* (2007.01)

(52) U.S. Cl.
USPC ............. 588/18; 588/315; 423/508; 423/601; 423/617

(58) Field of Classification Search
None
See application file for complete search history.

(56) References Cited

U.S. PATENT DOCUMENTS

| 5,294,315 | A * | 3/1994 | Cooper et al. ............. 204/158.2 |
| 5,688,378 | A * | 11/1997 | Khoe et al. ................. 204/157.4 |
| 2004/0185116 | A1* | 9/2004 | Hill et al. ....................... 424/617 |
| 2005/0215468 | A1* | 9/2005 | Bar-Or et al. ................... 514/12 |
| 2007/0007121 | A1 | 1/2007 | Guo et al. |
| 2008/0145918 | A1* | 6/2008 | Hishinuma et al. ........ 435/262.5 |

FOREIGN PATENT DOCUMENTS

| CL | 200700023 | 6/2007 |
| CL | 200703415 | 5/2008 |
| JP | 2007-209740 | 8/2007 |
| WO | 2008/012935 | 1/2008 |
| WO | 2008/012948 | 1/2008 |
| WO | 2008/012953 | 1/2008 |

OTHER PUBLICATIONS

Guo, Xuming et al. "Part 1. Identification of Volatile Arsenic Species". J. Anal. At. Spectrum 20, 702-708 (2005).*

McSheehy, Shona, et al. "Photochemical alkylation of inorganic arsenic. Part 2. Identification of aqueous phase organoarsenic species using multidimensional liquid chromatography and electrospray mass spectrometry". 20, 709-716 (2005).*

McSheehy, Shona, et al "Potochemical alkylation of inorganic arsenic Part 2. Identification of aqueous phase organoarsenic species using multidimensional liquid chromatography and electrospay mass spectrometry" J. Anal. At. Spectrom., 709-716, 20 (2005).*

Raucher, Stanley, et al. "Direct Observation of Radical Intermediates in the Photo Kolbe Reaction—Heterogeneous Photocatalytic Radical Formation by Electronic Spin Resonance". Journal of the American Chemcial Society. 100: 15 (1978).*

Cullen, William et al. "Preparation of Arsinocobaloximes and the Crystal Structure of CH3 C6H5 AsO COIII dmgH dmg2 COIII". Journal of the American Chemical Society. 101;23 (1979).*

Bentley, Ronald, et al. "Microbial Methylation of Metalloids: Arsenic, Antimony and Bismuth". Microbiology and Molecular Biology Reviews, pp. 250, 261-263 (2002).*

Spiros, P. et al. "Investigating the non-enzymatic methylation of arsenite by methylcobalamin B12 using high-performance liquid chromatography on-line with inductively coupled plasma-mass spectrometry". JAAS. 19, pp. 178-182 (2004).*

International Search Report of PCT/JP2008/003091, dated Jan. 27, 2009.

Kaise et al., "Cytotoxicological aspects of organic arsenic compounds contained in marine products using the mammalian cell culture technique," Applied Organometallic Chemistry, 1998, vol. 12, pp. 137-143.

Kaise et al., "Photocatalytic reactions of acetic acid on platinum-loaded TiO$_2$: ESR evidence of radical intermediates in the photo-Kolbe reaction," J. Chem. Soc., Chem. Commun., 1993, pp. 395-396.

(Continued)

*Primary Examiner* — Melvin C Mayes
*Assistant Examiner* — Sheng H Davis
(74) *Attorney, Agent, or Firm* — Hamre, Schumann, Mueller & Larson, P.C.

(57) ABSTRACT

It is an object of the present invention to provide a beneficial method for detoxifying a harmful compound to detoxify the harmful compound containing arsenic etc., effectively.

The method of detoxifying a harmful compound according to the present invention is characterized in that a methyl radical and/or a carboxymethyl radical is (are) contacted with a harmful compound comprising at least one element selected from the group comprising arsenic, antimony and selenium to detoxify the harmful compound. Furthermore, in a preferred embodiment of the method of detoxifying a harmful compound according to the present invention, the method is characterized in that the radical is generated by the exposure to light. Furthermore, in a preferred embodiment of the method of detoxifying a harmful compound according to the present invention, the method is characterized in that the resource of the radical is at least one selected from the group comprising acetic acid, methanol, ethanol, acetic anhydride, propionic acid, butanoic acid or formic acid.

21 Claims, 1 Drawing Sheet

(56) References Cited

OTHER PUBLICATIONS

Kaise et al., "Electron spin resonance studies of photocatalytic interface reactions of suspended $M/TiO_2$ (M = Pt. Pd, Ir, Rh. Os, or Ru) with alcohol and acetic acid in aqueous media," Langmuir, 1994, vol. 10, No. 5, pp. 1345-1347.

Nosaka et al., "Reaction mechanism of decomposition of acetic acid on illuminated $TiO_2$ powder studied by means of in situ electron spin resonance measurements." Langmuir, 1996, vol. 12, No. 3, pp. 736-738.

Kraeutler et al., "Heterogeneous photocatalytic synthesis of methane from acetic acid—new Kolbe reaction pathway." J. Am. Chem. Soc., 1978, vol. 100, No. 7, pp. 2239-2240.

Kraeutler et al., Heterogeneous photocatalytic decomposition of saturated carboxylic acids on $TiO_2$ powder, decarboxylative route to alkanes. J. Am. Chem. Soc., 1978, vol. 100, No. 19, pp. 5985-5992.

Kraeutler et al., "Direct observation of radical intermediates in the photo-Kolbe reaction—heterogeneous photocatalytic radical formation by electron spin resonance," J. Am. Chem. Soc., 1978, vol. 100, No. 15. pp. 4903-4905.

Kraeutler et al., "Heterogeneous photocatalytic preparation of supported catalysts. Photodeposition of platinum on $TiO_2$ powder and other substrates," J. Am. Chem. Soc., 1978, vol. 100, No. 13, pp. 4317-4318.

Ou Yang, "Adsorption characteristics of arsenite and arsenate on hydrous ceric oxide," Environmental Science, 2004, vol. 25, Sup., pp. 43-47 (English language abstract provided).

Chen, "Methyl compound of the heavy elements and its distribution under the natural environment," Guizhou Geology, 2004, vol. 21, No. 3, pp. 194-201 (English language abstract provided).

Wehmeier et al., Investigations into the role of methylcobalamin and glutathione for the methylation of antimony using isotopically enriched antimony(V)[+], Applied Organometallic Chemistry, 2004, vol. 18, pp. 631-639.

Guo et al., "UV light-mediated alkylation of inorganic selenium," Applied Organometallic Chemistry, vol. 17, Feb. 21, 2003, pp. 575-579.

\* cited by examiner

METHOD OF DETOXIFYING A HARMFUL COMPOUND

TECHNICAL FIELD

The present invention relates to a method of detoxifying a harmful compound, in particular, a method of detoxifying a harmful compound characterized by using a radical.

BACKGROUND ART

The heavy metal material such as arsenic, antimony and selenium is widely used as an industrial material, for example, semiconductor, but the influence on the organism by being flowed it out into an environment is concerned, since it is a harmful material for the organism.

In the past, as a method for treating these heavy metal, a method wherein a flocculating agent such as polychlorinated aluminum (PAC) is added into the wastewater containing an inorganic arsenic such as a harmful arsenous acid, and then the inorganic arsenic is removed by the filtration after the inorganic arsenic is aggregated, adsorbed to the flocculating agent and iron contained in a raw water and then precipitated, or a method of adsorbing an arsenic compound etc., by using an activated alumina, cerium based flocculating agent, are generally known.

On the other hand, it is known in nature that an inorganic arsenic occurs in sea food such as a seaweed, and then a part of the inorganic arsenic is converted to an organic arsenic compound such as dimethyl arsenic by the physiological response (Nonpatent literature 1: Kaise et al., 1998, Appl. Organomet. Chem., 12 137-143). And it is generally known that these organic arsenic compound has lower toxicity than that of the inorganic arsenic for the mammal.

Nonpatent literature 1: Kaise et al., 1998, Appl. Organomet. Chem., 12 137-143)

Patent literature 1: JP-A-2007-209740

DISCLOSURE OF THE INVENTION

Problems to be Resolved by the Invention

However, in the above method of removing the heavy metal characterized by the use of the filtration and adsorption etc., it is necessary to store or reclaim a polluted sludge containing the harmful compound such as the inorganic arsenic which is still harmful, and an absorbent to which the harmful compound is absorbed, under the condition of sealing off the harmful compound with the use of the concrete etc., in order to prevent it from being leaked to the outside. Therefore, there is a problem that the mass disposal is difficult since a storage place or a large space for a reclaimed area are required.

Moreover, since it is internationally recognized that an arsenic contained in the sea food is a harmless arsenobetaine, it is possible to attain the detoxification if a harmful inorganic arsenic can be chemically converted to a harmless arsenobetaine. Although the inventors suggest a method described in JP-A-2007-209740 as a method of detoxifying a harmful compound containing arsenic etc., effectively and systematically, more promotion of streamlining is desired.

Therefore, it is an object of the present invention to provide a beneficial method for detoxifying a harmful compound to detoxify the harmful compound containing arsenic etc., effectively, in order to resolve the above problems.

Means of Solving the Problems

In order to accomplish the above objects, the present inventors made strenuous studies on an alkylation, in particular, methylation, more preferably, trimethylation of the harmful compounds containing arsenic etc., by a chemical reaction using a radical to obtain a perfect conditions for the alkylation reaction of the harmful compound. As a result, the inventors discovered the present invention.

That is, the method of detoxifying a harmful compound according to the present invention is characterized in that a methyl radical and/or a carboxymethyl radical is (are) treated or reacted with a harmful compound comprising at least one element selected from the group comprising arsenic, antimony and selenium to detoxify the harmful compound.

Furthermore, in a preferred embodiment of the method of detoxifying a harmful compound according to the present invention, the method is characterized in that the radical is generated by the exposure to light.

Furthermore, in a preferred embodiment of the method of detoxifying a harmful compound according to the present invention, the method is characterized in that the resource of the radical is at least one selected from the group comprising acetic acid, methanol, ethanol, acetic anhydride, propionic acid, butanoic acid or formic acid.

Furthermore, in a preferred embodiment of the method of detoxifying a harmful compound according to the present invention, the method is characterized in that the methy radical and/or the carboxymethyl radical which is (are) generated by exposing at least one selected from the group comprising acetic acid, methanol, ethanol, acetic anhydride, propionic acid, butanoic acid or formic acid to light, is (are) reacted with the harmful compound to detoxify the harmful compound.

Furthermore, in a preferred embodiment of the method of detoxifying a harmful compound according to the present invention, the method is characterized in that the detoxification is further carried out by using titanium oxide or cerium hydroxide.

Furthermore, in a preferred embodiment of the method of detoxifying a harmful compound according to the present invention, the method is characterized in that the detoxification is carried out by alkylating arsenic, antimony and selenium.

Furthermore, in a preferred embodiment of the method of detoxifying a harmful compound according to the present invention, the method is characterized in that the detoxification is further carried out by using a cobalt complex.

Furthermore, in a preferred embodiment of the method of detoxifying a harmful compound according to the present invention, the method is characterized in that the alkylation is a methylation.

Furthermore, in a preferred embodiment of the method of detoxifying a harmful compound according to the present invention, the method is characterized in that the harmful compound is converted to a monomethyl compound, a dimethyl compound or a trimethyl compound by the methylation.

Furthermore, in a preferred embodiment of the method of detoxifying a harmful compound according to the present invention, the method is characterized in that the monomethyl compound is monomethylarsonylacetate, monomethylarsonylethanol, monomethylarsonylacetate or monomethyl arsonic acid.

Furthermore, in a preferred embodiment of the method of detoxifying a harmful compound according to the present invention, the method is characterized in that the dimethyl compound is dimethylarsonylethanol (DMAE), dimethylarsonylacetate (DMAA), dimethyl arsinic acid or arseno sugar.

Furthermore, in a preferred embodiment of the method of detoxifying a harmful compound according to the present invention, the method is characterized in that the trimethyl compound is arsenocholine, arsenobetaine, trimethyl arseno sugar or trimethylarsine oxide.

Effect of Invention

The method of detoxifying a harmful compound according to the present invention has an advantageous effect that a large space such as storage place is not required since it is possible to detoxify the harmful compound without limit. Furthermore, according to the method of the present invention, it has an advantageous effect that the unnecessary byproduct is not generated since it does not use a biological material in itself in a viable condition. Furthermore, according to the present invention, it has an advantageous effect that it is possible to decrease the harmful inorganic arsenic even more with a simple method.

BEST MODE FOR CARRYING OUT THE INVENTION

Figure 1:
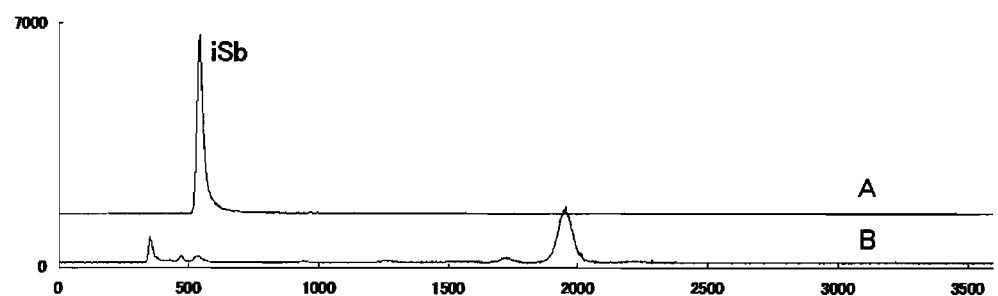
FIG. 1 gives a HPLC-ICP-MS chromatogram of the methylation reaction as to the inorganic antimony. (A: Before the reaction, B: After the reaction) [A methyl source: AA, A light source: UV-A, A photocatalyst: $TiO_2$ (RA91)] A vertical axis: intensity (cps), A horizontal axis: time (second)

The method of detoxifying the harmful compound according to the present invention is characterized in that a methyl radical and/or a carboxymethyl radical is (are) treated or reacted with a harmful compound comprising at least one element selected from the group comprising arsenic, antimony and selenium to detoxify the harmful compound. This depends on the reason that the present inventors discovered that the methyl radical and/or the carboxymethyl radical contribute to the alkylation, in particular, the methylation of arsenic etc., as a result of this, more detoxification of the harmful compound containing arsenic etc., can be attained. The inorganic arsenic is detoxified by the methylation. In addition to this, the existence of the methyl radical and/or the carboxymethyl radical make it possible to further accelerate the detoxification. The present inventions are extremely available in the extent that it is possible to convert the inorganic arsenic to the harmless arsenobetaine to detoxify it by means of the contact with the radical, as described later.

The generation of the radical is not particularly limited. It is possible to generate the radical by the exposure to light from a viewpoint that the methyl radical and/or the carboxymethyl radical can be generated in a more easily. The resource of the radical is not particularly limited, but mention may be made of at least one selected from the group comprising acetic acid, methanol, ethanol, acetic anhydride, propionic acid, butanoic acid or formic acid. That is, in the present invention, it is possible to react the methyl radical and/or the carboxymethyl radical generated by exposing at least one selected from the group comprising acetic acid, methanol, ethanol, acetic anhydride, propionic acid, butanoic acid or formic acid to the light, with the harmful compound to detoxify the harmful compound.

Furthermore, in a preferred embodiment of the present invention, the detoxification may be further carried out by using titanium oxide or cerium hydroxide. At this moment, as an example, the case that titanium oxide is used as a resource of the methyl radical and/or the carboxymethyl radical will be explained as follows.

It is known that the titanium oxide ($TiO_2$) has a strong oxidizing power with the exposure to light, withdrawing the electron from the surrounding substances (A standard oxidation-reduction potential is 3.0 V). The titanium oxide ($TiO_2$) has a strong ionic structure, $Ti^{4+}(O^{2-})_2$, by transferring the electron from Titanium (Ti) to oxygen (O). The explanation of this mechanism is as follows. The $Ti^{4+}(O^{2-})_2$ has a valence band (comprising 2P-orbitals of oxygen (O)) and a conductive band (comprising 3d-orbitals of titanium (Ti)). An electron of the valence band (O) raises to a conductive band (Ti) when a light having a shorter wavelength than 380 nm corresponding to a band gap energy (ultraviolet light) is irradiated to it. After that, the electron exists in an orbital of oxygen (O) having a lower energy level, but it transfers to an orbital of titanium (Ti) by being raised by means of the absorption of a photon energy. An orbital of oxygen becoming empty tends to capture an electron from outside, so that the surrounding substance (such as an organic material) is oxidized by the electron being withdrew from it. According to such mechanism, the exposure to light using titanium oxide makes it possible to generate the methyl radical etc. The methyl radical having a high reactivity reacts with the harmful compound such as the inorganic arsenic, thereby the inorganic arsenic etc., being alkylated to convert it to more harmless arsenobetaine. A detailed mechanism is unclear, but it is thought that when acetic acid is used as the resource of the methyl radical and/or the carboxymethyl radical as an example, the above mentioned reaction proceeds under the exposure to light at the interface of titanium oxide, thereby the alkylation of arsenic etc., proceeding to attain the detoxification of the harmful compound.

The conditions of the exposure to light depend on a conventional means, and are not particularly limited. From a viewpoint of the acceleration of the alkylation, an optical power is 0.1 to 1000 mW/cm$^2$, more preferably, 1 to 1000 mW/cm$^2$. An energy is 1 mJ to 100 J, preferably, 100 mJ to 100 J. As a wavelength of light to be exposed, mention may be made of an ultraviolet ray, a visible ray, a near-infrared ray, an infrared ray, a far infrared ray etc. Preferably, it is a light having a wavelength range that a center wavelength is a wavelength which a covalent bond of the organic compound, that is, the resource of the radical, such as acetic acid, methanol, ethanol, formic acid, is cleaved. The wavelength is 185 nm±100 nm, more preferably, 185 nm±50 nm, or 255 nm±100 nm, more preferably, 255 nm±50 nm. Further, in the case that titanium oxide is used as a catalyst, a wavelength range that a center wavelength is less or equal to 380 nm which is a wavelength corresponding to an oxidation-reduction potential of titanium oxide (3 eV) is preferable. It is preferably 380 nm±100 nm, more preferably, 380 nm±50 nm. In the case that cobalt complex is used, an alkylation reaction can be efficiently proceeded by exposing it to the light having a wavelength of λmax±500 nm, more preferably λmax±250 nm, furthermore preferably λmax±100 nm, wherein the λmax is an absorption maximum wavelength of an absorption band according to the cobalt complex as a center wavelength.

Moreover, the conditions of the temperature is also not particularly limited, a room temperature can also be used for proceeding the reaction. From a viewpoint of the an acceleration of the alkylation, a reaction temperature is 20 to 250° C., more preferably, 50 to 150° C.

At the moment, the term "the harmful compound" used herein means a compound which gives any adverse affect to the organism when it is flowed out into the environment and exposed to the organism.

As the harmful compound containing arsenic among the above harmful compound, mention may be made of arsenious acid, arsenic pentoxide, arsenic trichloride, arsenic pentachloride, arsenic sulfide compound, cyano arsenic compound, chloro arsenic compound, and other arsenic inorganic salt, phenyl arsenic compound and or the like. In these arsenic, for example, $LD_{50}$ (mg/kg) (50% of the fatal dose in mouse) is less or equal to 20, and therefore, it is generally a poisonous value for the organism.

Further, as a harmful compound containing antimony, mention may be made of antimony trioxide, antimony pentoxide, antimony trichloride, and antimony pentachloride etc.

Further, as a harmful compound containing selenium, mention may be made of selenium dioxide, selenium trioxide etc.

Furthermore, in a preferred embodiment of the method of detoxifying the harmful compound according to the present invention, the method is characterized in that the detoxification is further carried out by alkylating arsenic, antimony or selenium. At this moment, as an alkyl group added to the above arsenic, antimony or selenium, for example, mention may be made of a methyl group, an ethyl group, a propyl group etc. From a viewpoint that the detoxification can be attained more effectively, a methyl group is preferable as the alkyl group.

In a preferable embodiment, the detoxification can be further carried out by using a cobalt complex. A cobalt complex is not particularly limited, but mention may be made of an organometallic complex etc., having a cobalt-carbon bond. For example, mention may be made of at least one selected from the group comprising methyl complex of at least one compound selected from the group comprising methylcobalamin (methylated vitamin B12, official name: Coα-[α-5,6-dimethylbenz-1H-imidazole-1-yl-Coβ-methylcobamide]), vitamin B12 such as cyanocobalamin, cobalt(II) acetyl acetonate, cobalt(III) acetyl acetonate, cobalt carbonyl (dicobalt octacarbonyl), cobalt(II)1,1,1,5,5,5-hexafluoro acetyl acetonate, cobalt(II) meso-tetra phenyl porphin, hexafluoro phosphoric acid his (pentamethyl cyclopenta dienyl) cobalt, N,N'-bis(salicylidene) ethylene diamine cobalt(II), bis(2,2,6,6-tetramethyl-3,5-heptanedionato)cobalt(II), (chlorophthalocyaninnato) cobalt(II), chlorotris (triphenylphosphine) cobalt(I), methyl complex of cobalt(II) acetate, cobalt(II) benzoate, cobalt(II) cyanide, cyclohexane cobalt(II) butyrate, 2-cobalt(II) ethylhexanoate, meso-tetramethoxyphenyl porphyrin cobalt(II), cobalt naphthenate, cobalt(II) phthalocyanine, methyl cobalt(III) protoporphyrin IX, cobalt stearate, cobalt(II) sulfamate, (1R,2R)-(−)-1,2-cyclohexanediamino-N,N'-bis(3,5-di-t-butylsalicylidene) cobalt(II), (1S,2S)-(+)-1,2-cyclohexanediamino-N,N'-bis(3,5-di-t-butylsalicylidene) cobalt(II), cyclopentadienyl bis (triphenylphosphine) cobalt(I), cyclopentadienyl cobalt dicarbonyl, dibromo bis(triphenylphosphine) cobalt(II), (tetraminochloro phthalocyaninnato) cobalt(II), (tetra-t-butyl phthalocyaninnato) cobalt(II), or a cobalt-methyl complex formed by allowing the cobalt compound to coexist with the alkyl halide, especially methyl halide.

In the method of detoxifying the harmful compound according to the present invention, converting the harmful compound into a monomethyl compound, a dimethyl compound or a trimethyl compound by the methylation is preferable from a viewpoint that they are safer and have a low toxicity. As the monomethyl compound, for example, mention may be made of monomethylarsonylacetate, monomethylarsonylethanol, monomethylarsonylacetate or monomethyl arsonic acid. Further, as the dimethyl compound, for example, mention may be made of dimethylarsonylethanol (DMAE), dimethylarsonylacetate (DMAA), dimethyl arsinic acid or arseno sugar. As the trimethyl compound, for example, mention may be made of arsenocholine, arsenobetaine, trimethyl arseno sugar or trimethylarsine oxide.

EXAMPLE

The present invention will be concretely explained in more detail with reference to Examples, but the invention is not intended to be interpreted as being limited to Examples.

Example 1

Detoxification of the Inorganic Arsenic 0.5 mL of 1 ppm arsenic trioxide standard solution (Hereinafter, it gives iAs(III)), 7.7 mL of an ultrapure water (18MΩ/cm), and 1.8 mL of acetic acid (superhigh grade, hereinafter, it gives AA) were mixed (Solution A). As a catalyst, titanium oxide, cerium hydroxide, an absorbent for heavy metal (Nippon Sheet Glass Company Limited, Adosera, hereinafter, it gives AD) were prepared. As to titanium oxide, $TiO_2$ (A) (ACROS, an anatase-type) and $TiO_2$ (RA91) (Kishida Chemical Co., Ltd, 90% of a rutile type+10% of an anatase-type) were prepared. As to cerium hydroxide, ceric hydroxide (JUNSEI CHEMICAL CO., LTD.) were prepared. 2 mg (1.5 mmol) of methylcobalamin was solved with 1 mL of an ultrapure water, further, this was diluted hundredfold by adding an ultrapure water (Solution B). 1.5 mg of cyanocobalamin was solved with 1 mL of an ultrapure water, further, this was diluted hundredfold by adding an ultrapure water (Solution C). 1.5 mg of hydroxocobalamin was solved with 1 mL of an ultrapure water, further, this was diluted hundredfold by adding an ultrapure water (Solution D). These solutions and the catalyst were mixed as shown in the Table 1, the reaction solution were prepared and introduced into a sample tube. The Table 1 shows the preparation of the reaction solution and the light resources used for the experiment.

TABLE 1

| | Catalyst | | Reaction solution (μL) | | | | Light |
|---|---|---|---|---|---|---|---|
| No. | Catalyst | (mg) | Solution A | Solution B | Solution C | Solution D | Source |
| 1 | — | 0 | 1000 | 0 | 0 | 0 | UV-A |
| 2 | $TiO_2$(RA91) | 100 | 1000 | 0 | 0 | 0 | UV-A |
| 3 | — | 0 | 990 | 10 | 0 | 0 | UV-A |
| 4 | $TiO_2$(RA91) | 100 | 990 | 10 | 0 | 0 | UV-A |
| 5 | — | 0 | 990 | 0 | 10 | 0 | UV-A |

TABLE 1-continued

| No. | Catalyst | (mg) | Solution A | Solution B | Solution C | Solution D | Light Source |
|---|---|---|---|---|---|---|---|
| 6 | TiO$_2$(RA91) | 100 | 990 | 0 | 10 | 0 | UV-A |
| 7 | — | 0 | 990 | 0 | 0 | 10 | UV-A |
| 8 | TiO$_2$(RA91) | 100 | 990 | 0 | 0 | 10 | UV-A |
| 9 | TiO$_2$(A) | 100 | 1000 | 0 | 0 | 0 | — |
| 10 | TiO$_2$(A) | 100 | 1000 | 0 | 0 | 0 | UV-A |
| 11 | TiO$_2$(RA91) | 100 | 1000 | 0 | 0 | 0 | — |
| 12 | TiO$_2$(RA91) | 100 | 1000 | 0 | 0 | 0 | UV-A |
| 13 | cerium hydroxide | 100 | 1000 | 0 | 0 | 0 | — |
| 14 | cerium hydroxide | 100 | 1000 | 0 | 0 | 0 | UV-A |
| 15 | AD | 100 | 1000 | 0 | 0 | 0 | — |
| 16 | AD | 100 | 1000 | 0 | 0 | 0 | UV-A |
| 17 | — | 0 | 1000 | 0 | 0 | 0 | UV-C |

Conditions: [As]=0.17 nmoL/mL, [Co]=0.15 nmoL/mL, [AA]=3 mmoL/mL

An ultraviolet ray was directly irradiated from the upper side of the sample tube with an ultraviolet ray lamp (UV-A: 365 nm, LIGHTNIN GCURE LC5, HAMAMATSU), at a room temperature for a predetermined time (30 min., 1 hour, 2 hours). Further, as to a short wavelength ultraviolet ray (UV-C, wavelength: 253.7 nm, 184.9 nm, SEN, Lamp house: SUV110GS-36: high power and low-pressure mercury vapor lamp), it is also carried out by the same manner. 100 µL of the reaction solution were collected after the predetermined time with or without the exposure to the ultraviolet ray, were diluted twofold by adding the ultrapure water, the separated determination of the arsenic compound were carried out according to the HPLC-ICP-MS method. The results of these are shown in the Tables 2 and 3. The Table 2 shows a product of the reaction after the exposure to the ultraviolet ray. The Table 3 shows a product of the reaction after the exposure to the ultraviolet ray.

TABLE 2

| No. | Light source | Time (hr) | Relative ratio of the arseic compound in the reaction product (%) | | | | | | | | | | conversion ratio (%) |
|---|---|---|---|---|---|---|---|---|---|---|---|---|---|
| | | | As(V) | As(III) | MMA | UN8-9 | DMA | UN14 | UN15 | AB | UN29 | TMAO | |
| 1-1 | UV-A | 0.5 | 89.4 | 10.6 | 0.0 | 0.0 | 0.0 | 0.0 | 0.0 | 0.0 | 0.0 | 0.0 | ~100 |
| 1-2 | | 1 | 98.2 | 0.0 | 0.0 | 1.8 | 0.0 | 0.0 | 0.0 | 0.0 | 0.0 | 0.0 | ~100 |
| 1-3 | | 2 | 99.5 | 0.4 | 0.0 | 0.0 | 0.0 | 0.0 | 0.0 | 0.0 | 0.0 | 0.0 | ~100 |
| 2-1 | UV-A | 0.5 | 0.0 | 11.8 | 13.9 | 0.0 | 1.1 | 0.0 | 8.0 | 17.1 | 0.0 | 48.1 | 7 |
| 2-2 | | 1 | 0.0 | 0.0 | 0.0 | 0.0 | 0.0 | 0.0 | 10.2 | 28.9 | 0.0 | 60.8 | 7 |
| 2-3 | | 2 | 0.0 | 0.0 | 6.9 | 7.9 | 0.7 | 0.0 | 6.6 | 14.7 | 5.6 | 57.7 | 12 |
| 3-1 | UV-A | 0.5 | 91.1 | 6.2 | 0.0 | 0.0 | 0.0 | 0.1 | 0.9 | 0.7 | 0.0 | 1.0 | ~100 |
| 3-2 | | 1 | 96.8 | 2.0 | 0.0 | 0.0 | 0.0 | 0.1 | 0.7 | 0.0 | 0.0 | 0.4 | ~100 |
| 3-3 | | 2 | 95.2 | 1.2 | 0.0 | 1.7 | 0.0 | 0.1 | 0.5 | 0.4 | 0.1 | 0.7 | ~100 |
| 4-1 | UV-A | 0.5 | 0.0 | 7.6 | 10.2 | 0.0 | 4.5 | 0.5 | 11.3 | 19.4 | 5.0 | 36.6 | 15 |
| 4-2 | | 1 | 0.0 | 2.6 | 8.4 | 0.0 | 0.0 | 2.9 | 12.3 | 26.5 | 3.2 | 44.2 | 12 |
| 4-3 | | 2 | 0.0 | 0.0 | 5.2 | 4.3 | 0.9 | 0.5 | 7.9 | 18.6 | 4.5 | 53.5 | 18 |
| 5-1 | UV-A | 0.5 | 86.8 | 13.2 | 0.0 | 0.0 | 0.0 | 0.0 | 0.0 | 0.0 | 0.0 | 0.0 | ~100 |
| 5-2 | | 1 | 98.7 | 0.0 | 0.0 | 1.3 | 0.0 | 0.0 | 0.0 | 0.0 | 0.0 | 0.0 | ~100 |
| 5-3 | | 2 | 98.7 | 0.0 | 0.0 | 1.3 | 0.0 | 0.0 | 0.0 | 0.0 | 0.0 | 0.0 | ~100 |
| 6-1 | UV-A | 0.5 | 0.0 | 10.1 | 15.5 | 0.0 | 2.4 | 0.0 | 7.2 | 16.9 | 4.8 | 43.0 | 8 |
| 6-2 | | 1 | 0.0 | 0.0 | 14.6 | 0.0 | 0.0 | 0.0 | 8.1 | 19.7 | 8.6 | 49.0 | 8 |
| 6-3 | | 2 | 0.0 | 0.0 | 11.0 | 8.9 | 2.5 | 0.0 | 7.1 | 14.5 | 6.4 | 49.6 | 11 |
| 7-1 | UV-A | 0.5 | 77.6 | 22.4 | 0.0 | 0.0 | 0.0 | 0.0 | 0.0 | 0.0 | 0.0 | 0.0 | ~100 |
| 7-2 | | 1 | 98.5 | 1.5 | 0.0 | 0.0 | 0.0 | 0.0 | 0.0 | 0.0 | 0.0 | 0.0 | ~100 |
| 7-3 | | 2 | 99.2 | 0.8 | 0.0 | 0.0 | 0.0 | 0.0 | 0.0 | 0.0 | 0.0 | 0.0 | ~100 |
| 8-1 | UV-A | 0.5 | 0.0 | 11.9 | 19.9 | 0.0 | 1.1 | 0.0 | 8.5 | 16.5 | 0.0 | 42.0 | 7 |
| 8-2 | | 1 | 0.0 | 0.0 | 18.7 | 0.0 | 3.7 | 0.0 | 9.6 | 20.9 | 7.0 | 40.1 | 7 |
| 8-3 | | 2 | 0.0 | 0.0 | 20.7 | 4.4 | 0.9 | 0.0 | 6.6 | 12.7 | 4.4 | 50.3 | 9 |

TABLE 3

| No. | Light source | Time (hr) | Relative ratio of the arseic compound in the reaction product (%) | | | | | | | | | | conversion ratio (%) |
|---|---|---|---|---|---|---|---|---|---|---|---|---|---|
| | | | As(V) | As(III) | MMA | UN8-9 | DMA | UN14 | UN15 | AB | TMAO | Total | |
| 9 | — | 0.5 | 5.4 | 94.6 | 0.0 | 0.0 | 0.0 | 0.0 | 0.0 | 0.0 | 0.0 | 100 | 61 |
| 10-1 | UV-A | 0.5 | 92.5 | 6.6 | 0.0 | 0.0 | 0.9 | 0.0 | 0.0 | 0.0 | 0.0 | 100 | 59 |
| 10-2 | | 1 | 97.4 | 1.4 | 0.0 | 1.2 | 0.0 | 0.0 | 0.0 | 0.0 | 0.0 | 100 | 51 |
| 10-3 | | 2 | 95.5 | 2.3 | 0.0 | 0.0 | 2.2 | 0.0 | 0.0 | 0.0 | 0.0 | 100 | 33 |
| 11 | — | 0.5 | 0.0 | 0.0 | 0.0 | 0.0 | 0.0 | 0.0 | 0.0 | 0.0 | 0.0 | 0 | 0 |
| 12-1 | UV-A | 0.5 | 0.0 | 5.5 | 18.1 | 0.0 | 8.3 | 5.5 | 17.0 | 14.7 | 31.0 | 100 | 14 |
| 12-2 | | 1 | 0.0 | 0.0 | 12.1 | 0.0 | 8.4 | 5.9 | 18.0 | 18.6 | 37.0 | 100 | 13 |

TABLE 3-continued

| No. | Light source | Time (hr) | As(V) | As(III) | MMA | UN8~9 | DMA | UN14 | UN15 | AB | TMAO | Total | conversion ratio (%) |
|---|---|---|---|---|---|---|---|---|---|---|---|---|---|
| 12-3 |  | 2 | 0.0 | 3.1 | 5.8 | 13.7 | 2.6 | 3.1 | 8.0 | 13.7 | 50.0 | 100 | 23 |
| 13 | — | 0.5 | 0.0 | 0.0 | 0.0 | 0.0 | 0.0 | 0.0 | 0.0 | 0.0 | 0.0 | 0 | 4 |
| 14-1 | UV-A | 0.5 | 0.0 | 0.0 | 34.2 | 65.8 | 0.0 | 0.0 | 0.0 | 0.0 | 0.0 | 100 | 4 |
| 14-2 |  | 1 | 29.5 | 0.0 | 34.3 | 36.2 | 0.0 | 0.0 | 0.0 | 0.0 | 0.0 | 100 | 8 |
| 14-3 |  | 2 | 21.4 | 0.0 | 32.5 | 46.1 | 0.0 | 0.0 | 0.0 | 0.0 | 0.0 | 100 | 11 |
| 15 | — | 0.5 | 6.3 | 89.0 | 0.0 | 4.7 | 0.0 | 0.0 | 0.0 | 0.0 | 0.0 | 100 | ~100 |
| 16-1 | UV-A | 0.5 | 14.1 | 10.6 | 5.4 | 61.4 | 0.0 | 0.0 | 0.0 | 0.0 | 0.0 | 100 | ~100 |
| 16-2 |  | 1 | 14.3 | 3.7 | 4.1 | 17.2 | 0.0 | 0.0 | 0.0 | 0.0 | 0.0 | 100 | ~100 |
| 16-3 |  | 2 | 8.0 | 0.0 | 2.5 | 11.9 | 0.0 | 0.0 | 0.0 | 0.0 | 0.0 | 100 | ~100 |
| 17-1 | UV-C | 0.5 | 67.4 | 22.3 | 0.0 | 0.0 | 0.7 | 1.0 | 1.8 | 2.2 | 3.8 | 100 | ~100 |
| 17-2 |  | 1 | 77.4 | 5.3 | 0.0 | 0.0 | 0.6 | 2.1 | 2.0 | 4.5 | 7.0 | 100 | ~100 |
| 17-3 |  | 2 | 81.2 | 1.1 | 0.0 | 0.0 | 0.6 | 2.1 | 1.7 | 4.7 | 7.4 | 100 | ~100 |

A light power at the center wavelength (254 nm): 12 mW/cm$^2$ (UV-C)

In the table, it is shown that As(V): inorganic arsenic (pentavalent state), As(III): inorganic arsenic (trivalent state), MMA: monomethyl arsonic acid, DMA: dimethyl arsinic acid, AB: arsenobetaine (trimethyl arsonium acetic acid), TMAO: trimethyl arsine oxide, the conversion ratio was calculated by the following formula.

The conversion ratio(%)=total concentration of the arsenic compound after the reaction/total concentration of the arsenic compound before the reaction×100

Under the existence of titanium oxide, arsenic trioxide was methylated, and thereby harmless trimethyl arsenic (AB, TMAO) being produced (No. 2, 4, 6, 8). Under the existence of titanium oxide, even if it is under the existence of vitamin $B_{12}$ derivatives (Methylcobalamin, Cyanocobalamin, Hydroxocobalamin), the TMAO and the AB were produced. In the case of methylcobalamin, even if there is no titanium oxide, the TMAO and AB were produced (No. 3). Further, it is estimated that an unknown compound in the table (UN8~9, UN14, UN15) are compounds wherein a methyl group and a carboxymethyl group bond to arsenic, that is, monomethyl carboxymethyl arsenic, dimethyl arsinoyl acetic acid, monomethyl arsinoyl diacetate, dimethyl arsonium diacetate.

As a result of these, in the case that an ultraviolet ray of a short wavelength (UV-C) was irradiated, even if there are no catalyst (titanium oxide), a harmless trimethyl arsenic (AB, TMAO) ware produced (No. 17). In the case that cerium hydroxide was used as a catalyst, monomethyl arsenic (MMA) was produced when the ultraviolet ray (UV-A) was irradiated (No. 14). In the case that the AD was used as a catalyst, monomethyl arsenic (MMA) was produced when the ultraviolet ray (UV-A) was irradiated (No. 16).

Example 2

Detoxification of Antimony

Next, antimony was also examined instead of arsenic. Specifically, solution E which is those of the use of the inorganic antimony (iSb (IV)) instead of iAs (III) of the solution A used in the Example 1, was prepared, and the reaction was carried out under the conditions shown in Table 4. Moreover, the condition of No. 18 is the same condition as No. 2-2 of the Table 2, the condition of No. 19 is the same condition as No. 17-2 of the Table 3. The HPLC-ICP-MS chromatograms before and after the reaction are shown in the FIGS. 1 and 2.

TABLE 4

| No. | Reaction solution | | Catalyst | | exposure to light | |
|---|---|---|---|---|---|---|
|  |  | (μL) | Catalyst | (mg) | Light Source | Time (hr) |
| 18 | Solution E | 1000 | TiO$_2$(RA91) | 100 | UV-A | 1 |
| 19 | Solution E | 1000 | — | 0 | UV-C | 1 |

FIG. 1 gives a HPLC-ICP-MS chromatogram of the methylation reaction as to the inorganic antimony. (A: Before the reaction, B: After the reaction) [A methyl source: AA, A light source: UV-A, A photocatalyst: TiO$_2$ (RA91)] A vertical axis: intensity (cps), A horizontal axis: time (second)

Figure 2:
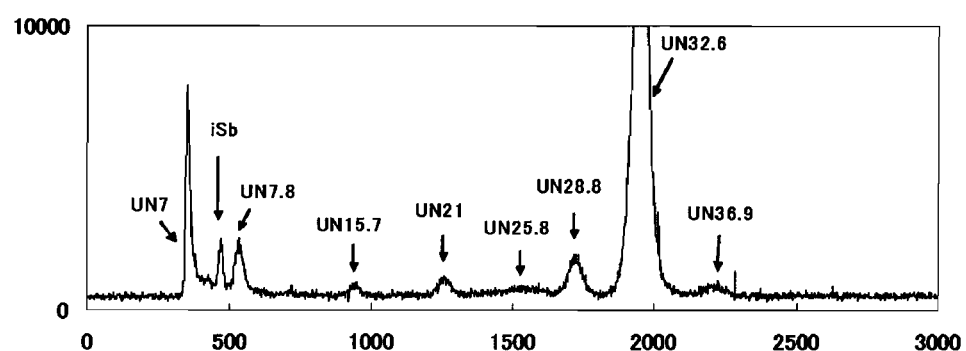
FIG. 2 gives a HPLC-ICP-MS chromatogram of the methylation reaction as to the inorganic antimony (After the reaction) (A methyl source: AA, A light source: UV-C, A photocatalyst: no). A vertical axis: intensity (cps), A horizontal axis: time (second)

FIG. 2 gives a HPLC-ICP-MS chromatogram of the methylation reaction as to the inorganic antimony (After the reaction) (A methyl source: AA, A light source: UV-C, A photocatalyst: no). A vertical axis: intensity (cps), A horizontal axis: time (second). A of the FIG. 1 is a chromatogram before the reaction, B of the FIG. 1 is a chromatogram after the reaction of No. 18, and the FIG. 2 is a chromatogram after the reaction of No. 19. Although there was only a peak of iSb before the reaction, a methylated antimony was produced after the reaction in both experiment 18 and 19.

Example 3

Detoxification of Selenium

Next, selenium was also examined instead of arsenic, antimony. Specifically, solution F which is those of the use of the inorganic selenium (iSe) instead of iAs (III) of the solution A used in the Example 1, was prepared, and the reaction was carried out under the conditions shown in the Table 5. The HPLC-ICP-MS chromatograms before and after the reaction are shown in the FIG. 3.

TABLE 5

| No. | Reaction solution (μL) | Catalyst | Catalyst (mg) | exposure to light Light Source | Time (hr) |
|---|---|---|---|---|---|
| 20 | Solution F 1000 | TiO$_2$(RA91) | 100 | UV-C | 1 |

Figure 3:
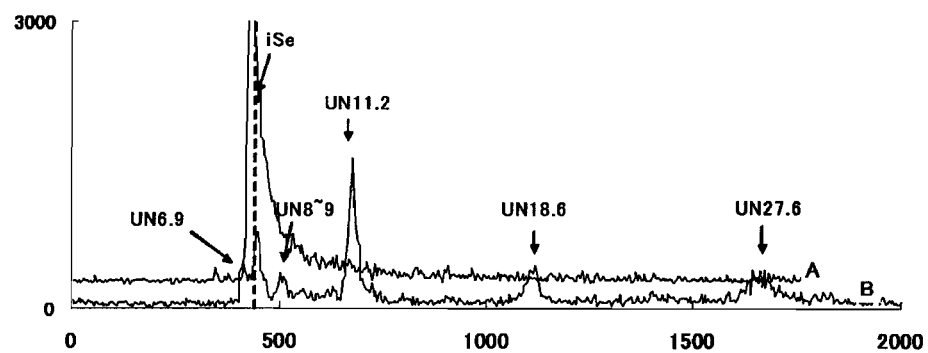
FIG. 3 gives a HPLC-ICP-MS chromatogram of the methylation reaction as to the inorganic selenium. (A: Before the reaction, B: After the reaction) [A methyl source: AA, A light source: UV-C, A photocatalyst: $TiO_2$ (RA91)] A vertical axis: intensity (cps), A horizontal axis: time (second)

FIG. 3 gives a HPLC-ICP-MS chromatogram of the methylation reaction as to the inorganic selenium (A: Before the reaction, B: After the reaction) [A methyl source: AA, A light source: UV-C, A photocatalyst TiO$_2$ (RA91)]. A vertical axis: intensity (cps), A horizontal axis: time (second).

A of the FIG. 3 is a chromatogram before the reaction, B of the FIG. 3 is a chromatogram after the reaction of No. 20. Although there was only a peak of iSe before the reaction, a methylated selenium was produced after the reaction.

Example 4

Detoxification in the Case of the Use of Various Methyl Resources

Next, various methyl resources were examined. As to the solution A used in the Example 1, formic acid (Hereinafter, it gives FA.), methanol (Hereinafter, it gives MeOH.), acetone (Hereinafter, it gives Act.), those which are mixed with 3 (formic acid):1 (acetic acid) of a mole fraction (Hereinafter, it gives 3FA/AA.) were used as a methyl resource instead of acetic acid (AA). The Table 6 shows the reaction material and the reaction conditions.

TABLE 6

| No. | Reaction solution Methyl resource | Catalyst | exposure to light Light Source | Time(hr) |
|---|---|---|---|---|
| 21 | FA | — | UV-C | 1 |
| 22 | MeOH | — | UV-C | 1 |
| 23 | Act | — | UV-C | 1 |
| 24 | 3FA/AA | — | UV-C | 1 |

As shown in the Table 6, the experiment was carried out by using UV-C as a light source without catalyst (Titanium oxide). 100 μL of the solution after the reaction were collected and diluted twofold by adding the ultrapure water, the separated determination of the arsenic compound were carried out according to the HPLC-ICP-MS method. The result is shown in the Table 7. The Table 7 shows a reaction production in the case that various methyl source are used.

TABLE 7

| No. | Relative ratio of the arseic compound in the reaction product (%) | | | | | | | | | | | | conversion |
| | UN5.9 | As(V) | As(III) | MMA | UN7.8 | UN8~9 | DMA | UN15~16 | UN17~18 | AB | UN28 | TMAO | ratio (%) |
|---|---|---|---|---|---|---|---|---|---|---|---|---|---|
| 21 | 0 | 0 | 50 | 28 | 0 | 23 | 0 | 0 | 0 | 0 | 0 | 0 | 50 |
| 22 | 0 | 4 | 90 | 2 | 3 | 1 | 0 | 0 | 0 | 0 | 0 | 0 | ~100 |
| 23 | 2 | 96 | 1 | 0 | 0 | 0 | 0 | 0 | 0 | 0 | 0 | 0 | 86 |
| 24 | 0 | 14 | 30 | 14 | 12 | 22 | 2 | 1 | 1 | 0 | 4 | 0 | 35 |

In the table, it is shown that As(V): inorganic arsenic (pentavalent state), As(III): inorganic arsenic (trivalent state), MMA: monomethyl arsonic acid, DMA: dimethyl arsinic acid, AB: arsenobetaine (trimethyl arsonium acetic acid), TMAO: trimethyl arsine oxide, the conversion ratio was calculated by the following formula.

The conversion ratio(%)=total concentration of the arsenic compound after the reaction/total concentration of the arsenic compound before the reaction×100

The result of these, methylated productions, that is, MMA, DMA, UN7.8, UN8~9, UN15~16, UN28 were also produced in the case that various methyl sources were used.

Example 5

Detoxification of a Phenyl Arsenic Compound

The phenyl arsenic compounds, that is, diphenyl arsinic acid (DPA), phenyl arsonic acid (PA), 3-nitro-4-hydroxyphenyl arsenic (NHPA) were used as the arsenic compound in the reaction solution instead of the inorganic arsenic. As to the reaction solution containing these arsenic compounds, the reaction was carried out under the conditions shown in the Table 8. The Table 8 shows a reaction material and a reaction condition in the case that the phenyl arsenic compound was used as a starting material.

TABLE 8

| | Reaction solution | | | exposure to light | |
| No. | Arsenic compound | Methyl source | Catalyst | Light Source | Time (hr) |
|---|---|---|---|---|---|
| 25 | DPA | AA | TiO$_2$(RA91) | UV-A | 1 |
| 26 | DPA | — | TiO$_2$(RA91) | UV-A | 1 |
| 27 | PA | AA | TiO$_2$(RA91) | UV-A | 1 |
| 28 | PA | — | TiO$_2$(RA91) | UV-A | 1 |
| 29 | NHPA | AA | TiO$_2$(RA91) | UV-A | 1 |
| 30 | NHPA | — | TiO$_2$(RA91) | UV-A | 1 |

100 μL of the solution after the reaction were collected and diluted twofold by adding the ultrapure water, the separated determination of the arsenic compound were carried out according to the HPLC-ICP-MS method. The result is shown in the Table 9.

The Table 9 shows a reaction production in the case that the phenyl arsenic compound was used as the stating material.

TABLE 9

| No. | Relative ratio of the arseic compound in the reaction product (%) | | | | | | | | | | | | conversion ratio (%) |
|---|---|---|---|---|---|---|---|---|---|---|---|---|---|
| | DPA | PA | NHPA | As(V) | As(III) | MMA | DMA | UN14 | UN15 | UN17 | AB | TMAO | |
| 25 | 0 | 0 | 0 | 0 | 0 | 0 | 100 | 0 | 0 | 0 | 0 | 0 | ~100 |
| 26 | 86 | 0 | 0 | 0 | 0 | 0 | 0 | 0 | 2 | 0 | 2 | 8 | ~100 |
| 27 | 0 | 0 | 0 | 0 | 0 | 3 | 0 | 3 | 19 | 3 | 20 | 52 | 20 |
| 28 | 0 | 0 | 0 | 0 | 0 | 5 | 0 | 0 | 13 | 6 | 23 | 53 | 11 |
| 29 | 0 | 0 | 0 | 0 | 0 | 59 | 0 | 0 | 0 | 0 | 0 | 41 | 1 |
| 30 | 0 | 0 | 0 | 0 | 0 | 24 | 0 | 0 | 0 | 0 | 37 | 39 | 2 |

In the table, it is shown that As(V): inorganic arsenic (pentavalent state), As(III): inorganic arsenic (trivalent state), MMA: monomethyl arsonic acid, DMA: dimethyl arsinic acid, AB: arsenobetaine (trimethyl arsonium acetic acid), TMAO: trimethyl arsine oxide, the conversion ratio was calculated by the following formula.

The conversion ratio(%)=total concentration of the arsenic compound after the reaction/total concentration of the arsenic compound before the reaction×100

As a result mentioned above, a harmful trimethyl arsenic (TMAO, AB) was produced from both the DPA, PA which are an arsenic compound derivative used as a chemical weapon and the NHPA which is used as an agricultural chemical.

INDUSTRIAL APPLICABILITY

The methods according to the present inventions make a significant contribution in the broad fields of treatments of the industrial waste etc., and environmental protections concerning a polluted mud or a soil, since the harmless compound obtained by converting the harmful compounds such as arsenic to more harmless compound is extremely stable and safe.

The invention claimed is:

1. A method of detoxifying a harmful compound in vitro, comprising:
    contacting a harmful compound with (1) at least one selected from the group consisting of a methyl radical and a carboxymethyl radical and (2) a cobalt complex so as to detoxify the harmful compound,
    wherein the harmful compound comprises at least one element selected from the group consisting of arsenic, antimony and selenium,
    wherein the cobalt complex is an organometallic complex having a cobalt-carbon bond, and
    wherein the methyl radical or the carboxymethyl radical is generated from at least one selected from the group consisting of acetic acid, methanol, ethanol, acetic anhydride, propionic acid, butanoic acid and formic acid.

2. A method of detoxifying a harmful compound according to claim 1, wherein the radical is generated by the exposure to light.

3. A method of detoxifying a harmful compound according to claim 1, wherein the detoxification is further carried out by using titanium oxide or cerium hydroxide.

4. A method of detoxifying a harmful compound according to claim 1, wherein the detoxification is carried out by alkylating arsenic, antimony and selenium.

5. A method of detoxifying a harmful compound according to claim 4, wherein the alkylation is a methylation.

6. A method of detoxifying a harmful compound according to claim 5, wherein the harmful compound is converted to a monomethyl compound, a dimethyl compound or a trimethyl compound by the methylation.

7. A method of detoxifying a harmful compound according to claim 6, wherein the monomethyl compound is monomethylarsonylacetate, monomethylarsonylethanol, or monomethyl arsonic acid.

8. A method of detoxifying a harmful compound according to claim 6, wherein the dimethyl compound is dimethylarsonylethanol (DMAE), dimethylarsonylacetate (DMAA), dimethyl arsinic acid or arseno sugar.

9. A method of detoxifying a harmful compound according to claim 6, wherein the trimethyl compound is arsenocholine, arsenobetaine, trimethyl arseno sugar or trimethylarsine oxide.

10. A method of detoxifying a harmful compound according to claim 1, wherein the organometallic complex having a cobalt-carbon bond is a methyl complex that includes at least one selected from the group consisting of methylcobalamin (Coα-[α-5,6-dimethylbenz-1H-imidazole-1-yl-Coβ-methylcobamide]), a vitamin B12 and a cobalt-methyl complex that is formed by allowing the cobalt compound to be present with an alkyl halide.

11. A method of detoxifying a harmful compound according to claim 10, wherein the vitamin B12 is cyanocobalamin, cobalt(II) acetyl acetonate, cobalt(III) acetyl acetonate, cobalt carbonyl (dicobalt octacarbonyl) cobalt(II) 1,1,1,5,5,5-hexafluoro acetyl acetonate, cobalt(II) meso-tetra phenyl porphin, hexafluoro phosphoric acid bis(pentamethyl cyclopenta dienyl) cobalt, N,N'-bis(salicylidene) ethylene diamine cobalt (II), bis(2,2,6,6-tetramethyl-3,5-heptanedionato) cobalt(II), (chlorophthalocyaninnato) cobalt(II), chlorotris(triphenylphosphine) cobalt(I), methyl complex of cobalt(II) acetate, cobalt(II) benzoate, cobalt(II) cyanide, cyclohexane cobalt(II) butyrate, 2-cobalt(II) ethylhexanoate, meso-tetramethoxyphenyl porphyrin cobalt (II), cobalt naphthenate, cobalt(II) phthalocyanine, methyl cobalt(III) protoporphyrin IX, cobalt stearate, cobalt(II) sulfamate, (1R,2R)-(−)-1,2-cyclohexanediamino-N,N'-bis(3,5-di-t-butylsalicylidene) cobalt(II), (1S,2S)-(+)-1,2-cyclohexanediamino-N,N'-bis(3,5-di-t-butylsalicylidene) cobalt(II), cyclopentadienyl bis(triphenylphosphine) cobalt(I), cyclopentadienyl cobalt dicarbonyl, dibromo bis(triphenylphosphine) cobalt(II), (tetraminochloro phthalocyaninnato) cobalt(II) or (tetra-t-butyl phthalocyaninnato) cobalt(II).

12. A method of detoxifying a harmful compound in vitro, comprising:
    contacting a harmful compound with (1) at least one selected from the group consisting of a methyl radical and a carboxymethyl radical and (2) a cobalt complex so as to detoxify the harmful compound,
    wherein the harmful compound comprises at least one element selected from the group consisting of arsenic, antimony and selenium, wherein the cobalt complex is an organometallic complex having a cobalt-carbon bond, and wherein the methyl radical and/or the carboxymethyl radical is (are) generated by exposing at least one selected from the group consisting of acetic acid, methanol, ethanol, acetic anhydride, propionic acid, butanoic acid and formic acid to light, and is (are) reacted with the harmful compound to detoxify the harmful compound.

13. A method of detoxifying a harmful compound according to claim 12, wherein the detoxification is further carried out by using titanium oxide or cerium hydroxide.

14. A method of detoxifying a harmful compound according to claim 12, wherein the detoxification is carried out by alkylating arsenic, antimony and selenium.

15. A method of detoxifying a harmful compound according to claim 14, wherein the alkylation is a methylation.

16. A method of detoxifying a harmful compound according to claim 15, wherein the harmful compound is converted to a monomethyl compound, a dimethyl compound or a trimethyl compound by the methylation.

17. A method of detoxifying a harmful compound according to claim 16, wherein the monomethyl compound is monomethylarsonylacetate, monomethylarsonylethanol, or monomethyl arsonic acid.

18. A method of detoxifying a harmful compound according to claim 16, wherein the dimethyl compound is dimethylarsonylethanol (DMAE), dimethylarsonylacetate (DMAA), dimethyl arsinic acid or arseno sugar.

19. A method of detoxifying a harmful compound according to claim 16, wherein the trimethyl compound is arsenocholine, arsenobetaine, trimethyl arseno sugar or trimethylarsine oxide.

20. A method of detoxifying a harmful compound according to claim 12, wherein the organometallic complex having a cobalt-carbon bond is a methyl complex that includes at least one selected from the group consisting of methylcobalamin (Coα-[α-5,6-dimethylbenz-1H-imidazole-1-yl-Coβ-methylcobamide]), a vitamin B12 and a cobalt-methyl complex that is formed by allowing the cobalt compound to be present with an alkyl halide.

21. A method of detoxifying a harmful compound according to claim 20, wherein the vitamin B12 is cyanocobalamin, cobalt(II) acetyl acetonate, cobalt(III) acetyl acetonate, cobalt carbonyl (dicobalt octacarbonyl) cobalt(II) 1,1,1,5,5,5-hexafluoro acetyl acetonate, cobalt(II) meso-tetra phenyl porphin, hexafluoro phosphoric acid bis (pentamethyl cyclopenta dienyl) cobalt, N,N'-bis(salicylidene) ethylene diamine cobalt (II), bis(2,2,6,6-tetramethyl-3,5-heptanedionato) cobalt(II), (chlorophthalocyaninnato) cobalt(II), chlorotris(triphenyl phosphine) cobalt(I), methyl complex of cobalt(II) acetate, cobalt(II) benzoate, cobalt(II) cyanide, cyclohexane cobalt(II) butyrate, 2-cobalt(II) ethylhexanoate, meso-tetramethoxyphenyl porphyrin cobalt (II), cobalt naphthenate, cobalt(II) phthalocyanine, methyl cobalt(III) protoporphyrin IX, cobalt stearate, cobalt(II) sulfamate, (1R,2R)-(−)-1,2-cyclohexanediamino-N,N'-bis(3,5-di-t-butylsalicylidene) cobalt(II), (1S,2S)-(+)-1,2-cyclohexanediamino-N,N'-bis(3,5-di-t-butylsalicylidene) cobalt(II), cyclopentadienyl bis (triphenylphosphine) cobalt(I), cyclopentadienyl cobalt dicarbonyl, dibromo bis(triphenylphosphine) cobalt(II), (tetraminochloro phthalocyaninnato) cobalt(II) or (tetra-t-butyl phthalocyaninnato) cobalt(II).

* * * * *